United States Patent [19]

Manniso et al.

[11] Patent Number: 4,931,178
[45] Date of Patent: Jun. 5, 1990

[54] FILTER CLOTH ASSEMBLY

[75] Inventors: James L. Manniso, Newark; John H. Lutz, Claymont; Craig R. Rinschler, Hockessin, all of Del.

[73] Assignee: W. L. Gore & Associates, Inc., Newark, Del.

[21] Appl. No.: 723,848

[22] Filed: Apr. 16, 1985

[51] Int. Cl.⁵ .............................................. B01D 25/12
[52] U.S. Cl. .................................... 210/228; 210/230; 210/231; 210/445
[58] Field of Search ............... 210/770, 224, 227, 228, 210/229, 230, 231, 445; 100/93 R, 93 P, 101, 113, 194, 298; 204/252, 279, 290 F, 296

[56] References Cited

U.S. PATENT DOCUMENTS

| | | | |
|---|---|---|---|
| 3,988,242 | 10/1976 | Kurita et al. | 210/227 |
| 4,053,416 | 10/1977 | Howard et al. | 210/227 |
| 4,235,721 | 11/1980 | Nakamura et al. | 210/227 |
| 4,237,009 | 12/1980 | Kurita | 210/227 |
| 4,317,734 | 3/1982 | Kurita | 210/227 |
| 4,431,502 | 2/1984 | Ford | 204/252 |

Primary Examiner—W. Gary Jones
Assistant Examiner—Wanda L. Millard
Attorney, Agent, or Firm—Mortenson & Uebler

[57] ABSTRACT

This invention provides a filter cloth assembly for use on a filter plate of a center-feed filter press, which comprises a two-part filter cloth with fittings for rapid and easy assembly on the filter plate, one cloth on each side. Methods of manufacture of the novel assembly and its parts and a new method for bonding otherwise incompatible plastics and elastomers are disclosed.

16 Claims, 2 Drawing Sheets

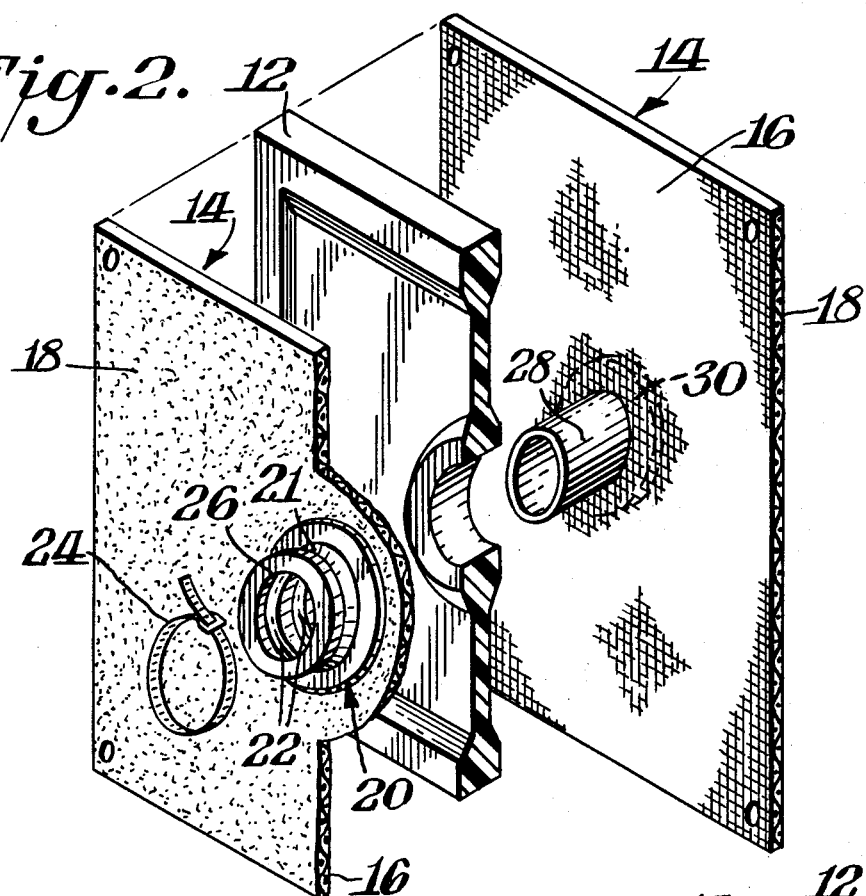
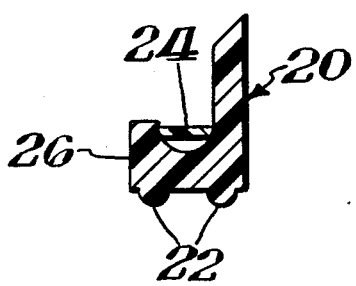
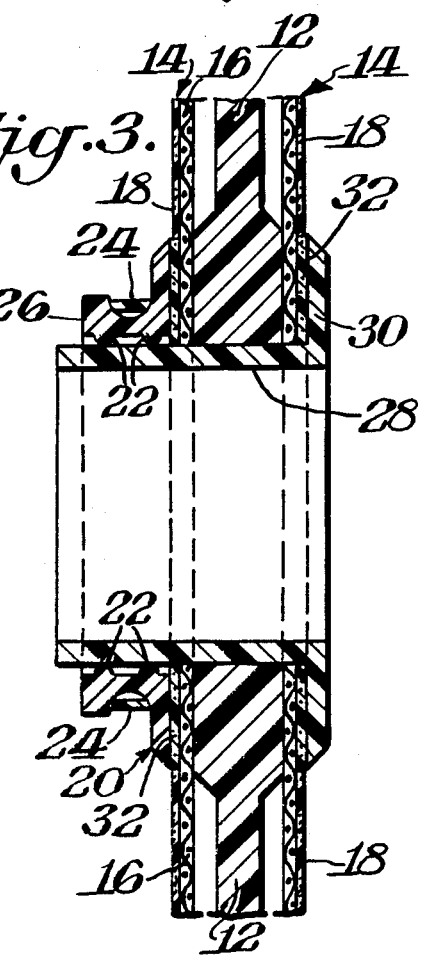

FILTER CLOTH ASSEMBLY

BACKGROUND OF THE INVENTION

This invention relates to a filter cloth assembly for use on a filter press plate, more particularly a center-feed filter press plate, which operates with a filter cloth on each side of the plate, a method for assembling a novel two-part filter cloth onto the plate, and a method for manufacturing the novel two-part filter cloth.

Filter presses are a well-known type of pressure filter made especially for liquid/solid separations. Such presses include a series of filter plates which are compressed together between two heads. Covering each plate is a filter cloth which covers all the area where filtration occurs. Each plate typically includes an opening located within the filtration surface area, usually near the center of the plate, and the plate has channels in its surface for passage of liquids. A solid/liquid mixture enters through the opening, passes into the spaces between the plates, then the liquid portion passes through the filter cloths into the channels and exits through an exit port for each plate. As the filtrate passes through the filter cloths, a cake of solids is built up in the spaces between the plates on the filter cloths. When the filter press is filled with solid filter cake material, the filtration is stopped, and the cake is either washed from the press or, alternatively, the press is opened, the plates separated, and the solid filter cake is removed. The filter cloth can then also be removed for washing or replacement.

In the center-hole type press, a conventional filter cloth passes through the center hole of the plate and covers both sides of the plate. Most of such filter cloths available for use are comprised of a single unit having two sides with an interconnected tubular center hole section, the two sides of filter cloth usually being of unitary construction, and typically sewn together. This construction, while typical, is barely manageable if the filter cloth is stiff in nature or large in size, because one side of the cloth must be folded together and squeezed through the center hole of the filter plate, then unfolded on the other side to cover the other side of the filter plate. This process is often very difficult and time consuming, particularly if the filter cloth must be changed frequently.

A metal, such as brass, or a plastic, screw-threaded, reusable mechanical coupling to hold two filter cloths together on opposite sides of a filter plate, has also been used. Each half has a flange which holds the filter cloth against the plate. Thread clogging with slurry and thread wear upon coupling and uncoupling the filter assembly can be problems. The amount of filter cloth caught behind and held by each flange is small, and hard turns of the coupling to hold it firmly in place under high pressure may damage the filter cloth. The amount of pressure used is also a variable with each instance of installation of the cloth by each installer. Further, threaded fittings may open up the interior of the filter plate/filter cloth assembly to bypass of the seal through the bottoms of the thread root channels under liquid pressure.

A filter cloth embodying two filter cloths is disclosed in U.S. Pat. No. 4,053,416. Two single pieces of filter cloth were used, each having flexible flanged-based tubular stemmed coupling members which fitted into each end of a coupling cylinder which passed through the hole in the plate. A tool was utilized to effect the coupling which involved eversion of the flexible stem of one of the filter cloths into place in the coupling cylinder by means of the tool. No attachment was provided for the two cloths to each other and each cloth was held in place by friction between the springy elastomeric stem and the coupling cylinder in which it resided when the filter cloth was assembled. The lack of attachment of the two cloths to each other and the varying amount of hold available from friction may be sources of leakage or provide attachment problems under rigorous conditions. Known methods for attaching the stem or coupling member to the filter cloth, such as stitching, may provide a source of leakage through the stitch holes. Manipulation of the tool to evert the coupling of one cloth, assembling the cloth on a filter plate, then withdrawing the tool may not be as rapid or efficient a method of assembly as desired.

SUMMARY OF THE INVENTION

It is accordingly an object of the present invention to provide a filter cloth assembly for use on a center feed filter plate of a filter press which avoids the problems of prior art filter cloths.

Another object of the invention is to provide a filter cloth assembly which is fast and easy to assemble on the filter plate or disassemble from it and provides a good liquid-tight seal with the plate.

A further object of the present invention is to provide novel methods for attaching and sealing coupling members, especially those having flanged bases, to filter cloths, then assembling the cloths into place on the filter plate.

Briefly, the invention embodies a filter cloth assembly for use on a center hole filter press plate, a method for making flanged-based coupling members which are sealed to the filter cloth, and a method for adhering certain incompatible elastomeric polymers together which are useful in manufacturing the filter cloths of the invention.

The filter cloth assembly comprises two sections of a filter cloth disposed on opposite sides of a center-hole type of filter press plate, the first cloth having secured to it in alignment with a hole corresponding to that in the filter press plate a flanged-based tubular stem. The second filter cloth comprises a similar cloth bearing a short flanged-based tubular coupling. The stem of the first filter cloth is passed through the hole in the press plate, the coupling of the second filter cloth fitted over the protruding end of the stem of the first filter cloth such that the coupling surrounds the stem in a close-fitting concentric configuration, and a plastic or metal tension strap or band clamp placed around the outside of the coupling in a groove provided therein, and the strap or band clamp closed to a tension sufficient to effect a liquid-tight seal between the stem and the coupling.

Methods are given for either forming in place or adhering to the two filter cloths the flanged-based tubular stem and coupling by known methods or by a novel process to be subsequently described in detail.

BRIEF DESCRIPTION OF THE DRAWINGS

FIG. 2 is an exploded section view taken through the center hole of a filter press plate, including the plate, the first and second filter cloths disposed on either side of the plate, and the tension strap or band clamp to hold the two cloths in place tightly to the plate.

FIG. 3 is a broken sectional view of the filter cloth assembly in place on the filter plate.

FIG. 4 is a cross section of the second flanged-based tubular coupling, including circumferential beads molded into the inside surface of the coupling to aid in achieving a tight liquid seal with the stem from the other cloth.

DETAILED DESCRIPTION OF THE PREFERRED EMBODIMENTS

Figure 1:
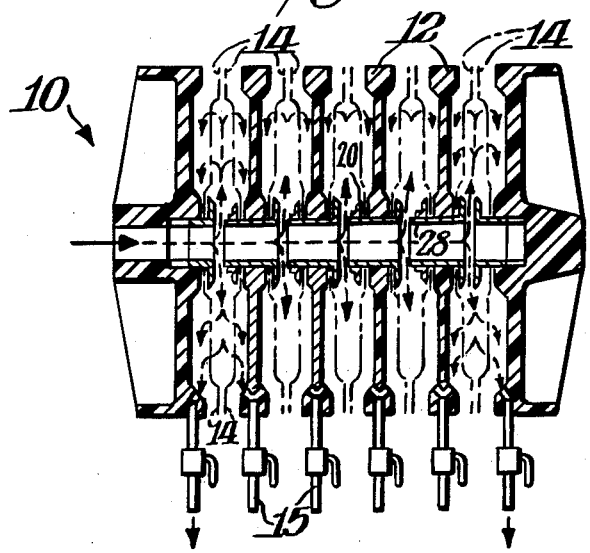
FIG. 1 is a schematic cross-sectional diagram of a filter press assembly.

A detailed description of the invention is best provided with reference to the accompanying drawings wherein FIG. 1 shows a schematic cross-sectional diagram of filter press 10 containing conventional filter plates 12. The flow direction of slurry to be filtered and the outflow of filtrate are indicated by the arrows. The filter plates 12, when the assembly is completed, retain the filter cloths 14 in place, and the slurry flows to the cloths which collect the solids and allow the filtrate to pass through and exit the filter through outlet ports 15. The flange-based stems 28 in the center holes of each filter plate 12 are discussed in detail below.

Referring to FIG. 2, there is shown a detailed schematic view of a filter cloth assembly for use on a center-hole type filter plate for use in a pressure filter press of the standard type, wherein a series of filter plates having filter cloths in place on each side are pressed together face to face such that a seal is formed at the edges of the plates between the stack of plates. The liquid/solid mixture to be filtered is pumped through the center hole of the press, the solids are retained on the filter cloths of the plates as the liquid flows through the filter cloths, and the filtrate flows from the press from outlet ports in the channels provided therefor within the area covered by the filter cloths.

Filter cloth 14 is preferably a polypropylene or polyester textile felt or woven fabric to which is bonded to a polypropylene stem 28 having flange 30 as shown. The flange 30 and the attached stem 28 are molded from a thermoplastic such as polypropylene, or other suitable thermoplastic materials, or from polytetrafluoroethylene (PTFE) material. Flange 30 is fuse-bonded or bonded by means of a polypropylene hot melt or, in the case of a PTFE stem 28, a fluorinated ethylene-propylene (FEP) or poly fluoro alkylene (PFA) polymer hot melt, to the cloth 14, thereby providing a liquid-tight seal which prevents the liquid-solid mixture from by-passing the filter cloth 14.

Referring to FIG. 3, the bond between flange 30 and filter cloth 14 is indicated 32. Other plastics may be used for the stem 28 and cloth 14 which will have equivalent properties. Stem 28 is bonded to cloth 14 on the reverse side from the extended portion of the stem 28 which will extend through the hole of filter plate 12 to mate with and be attached to the second filter cloth 14 on the other side of plate 12. Where stem 28 with molded flange 30 is formed from PTFE, and the cloth is a PTFE felt or fabric filter cloth, stem 28 is preferably preformed or premolded and then heat-bonded, melt-fused, or fuse-bonded with heat and pressure to cloth 14 by a layer 32 of FEP or PFA heat-fusible fluorocarbon polymer.

Referring to both FIGS. 2 and 3, filter cloth preferably is a composition of a textile cloth 16 and a membrane 18 of expanded porous PTFE. Coupling 26 having flange 20 is preferably silicone rubber or Viton® fluoro elastomer, and is molded in place on the filter cloth from liquid rubber or Viton fluoro elastomer and cured by a catalyst over a specified time and/or is heat cured. Where stem 28 is formed from PTFE, coupling 26 is formed by molding it in place on the filter cloth from Viton fluoro elastomer or fluoro silicone rubber.

To assemble the filter cloths on the filter plate, the plate 12 is laid over one cloth 14 as shown such that stem 28 protrudes through the hole therein. The second cloth 14 is placed cloth-down on plate 12 over stem 28 which closely fits through coupling 26 to close tolerance. In this configuration, the porous PTFE membrane 18 is always upstream of the textile layer 16. Tension strap or band clamp 24 is then placed in the groove 21 about coupling 26 and tightened to the degree necessary to insure a liquid tight seal under the operating pressure being used with the filter press. The band 24 may be a standard metal band clamp or a plastic strap and lock.

FIG. 3 shows the assembled filter cloths 14 on the filter plate 12. Flange 30 of stem 28 provides a positive clamping effect on filter cloth 14 as does the flange 20 of coupling 26 when coupling 26 is pressed onto the filter plate 12 and strap 24 is appropriately tightened and locked. Bond 32 is formed between filter cloth 14 and flange 20.

A preferred method of manufacture of flanged coupling 26 is to preform or premold flanged coupling 26 from silicone rubber or Viton fluoro elastomer or other suitable thermosetting elastomeric materials which have equivalent properties.

Figure 5:
FIG. 5 is a cross-section of a thermosetting elastomer into which a thermoplastic cloth has been pressed prior to fully curing the elastomer.
Figure 6:
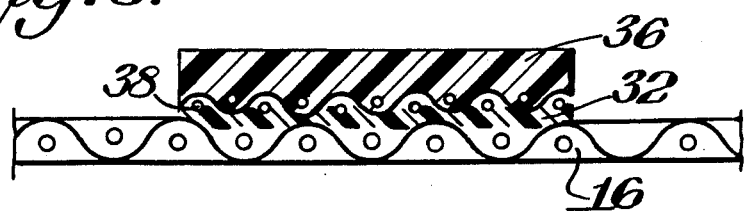
FIG. 6 is a cross-section of the elastomer and cloth shown in FIG. 5 adhesively bonded to a filter cloth.

A method for bonding otherwise adhesively incompatible materials, for example, a fully cured silicone rubber coupling to a polypropylene textile felt filter cloth is depicted in FIGS. 5 and 6. Therein is shown, in FIG. 5, a premolded elastomeric coupling 36 of silicone rubber, into which a thermoplastic cloth, woven or felt or other similar material, has been pressed prior to full curing of the elastomer 36. The pressing is done so that the elastomer penetrates into the cloth but does not penetrate all the way through the cloth 38. Upon full cure of the elastomer, the cloth 38 is mechanically tightly bound to the elastomer 36 and presents an adhesively compatible under surface of the composite coupling/cloth which can be adhesively bonded to the various filter cloths 16 by adhesive 32 as shown in FIG. 6. The cloth 38 can be polyester or polypropylene or other similar plastic material.

Figure 7:
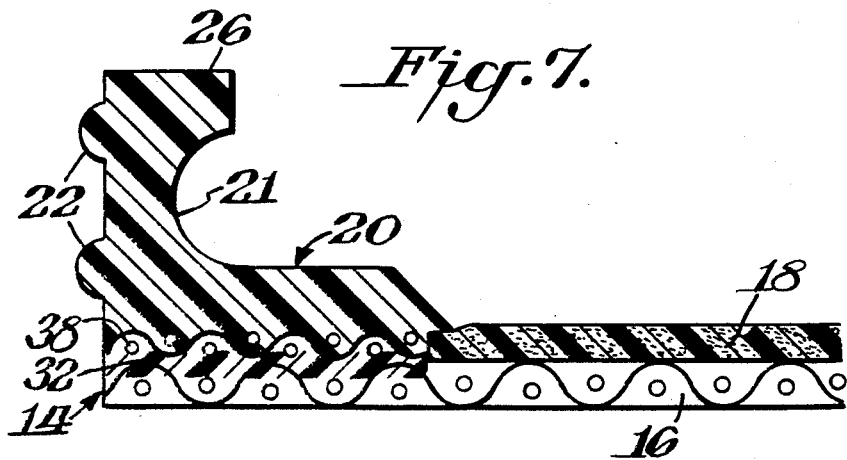
FIG. 7 is a cross-section of an elastomeric filter coupling of the invention firmly bonded with an adhesive to an otherwise adhesively incompatible filter cloth.

When using this method and the coupling 26 of the invention, after the coupling of silicone rubber is fully cured, a silicone adhesive 32 such as silicone "L" is coated on the surface of flange 20 to be bonded and around the hole area on filter cloth 14, as depicted in FIG. 7, and heat and pressure are applied so that the silicone adhesive penetrates both the polypropylene felt 38 bonded to coupling 26 and the surface of cloth layer 16. As shown in FIG. 7, the expanded PTFE layer 18 has been removed from the bond region so as to provide the adhesively compatible surface of cloth layer 16 for bonding. When cure is complete, a strong, tenacious and leak-proof bond 32 is formed.

Alternatively, bond 32 may be formed without using an adhesive when the cloth 38 and the cloth layer 16 are both thermoplastics such as polypropylene or polyester. The bond is formed by applying heat and pressure to melt and fuse the cloths together.

Additionally, the flanged coupling 26 of silicone rubber or fluoro elastomer could be molded in place onto the filter mat felt around the hole and cured to solid form, with, again, penetration of the liquid rubber only partially into the interstices of the textile filter felt. By this method, silicone rubbers or fluoro elastomers can be made to form strongly bonded structures with a textile felt where the interstices of the felt are partially filled by the polymer, and the fibers of the felt link the two otherwise adhesively incompatible polymers together. Textile felts or woven fabrics of polymers other than polypropylene and polyester may be used where they provide equivalent properties.

FIG. 4 is a cross-section of the flanged coupling 26 which has been molded with two beads 22 around the interior circumference, spaced so as to aid in forming a liquid-tight seal around stem 28 where stem 28 may be uneven or out-of-round and also spaced such that pressure from strap or ring clamp 24 will center between the two beads when clamp 24 is tightened.

The most preferred filter cloth material 14 for use in the filter cloth assembly of the invention is a layered composite sheet of filter cloth containing an upstream layer 18 of porous expanded PTFE bonded to a woven or felt textile filter 18 cloth of polypropylene, polyester, or the equivalent of these in properties. The porous, expanded PTFE is prepared in accordance with one or more of U.S. Pat. Nos. 4,187,390; 4,110,392; 4,096,227; 3,962,153; 3,953,566; and 4,025,679. The PTFE surface minimizes adherence of filtered solids to the filter cloth and aids in rapid and easy cleaning of the cloth.

When a filter cloth having a layer of porous expanded PTFE is used in the assembly of the invention, as mentioned above the PTFE in the area of the cloth around the hole to be bonded to the flanges of stem 28 and coupling 26 must be removed so that the underlying polypropylene or polyester layer can be bonded to the flange. This can be done by a mechanical abrasion method, such as by using a wire brush or grit disc. Where the flanged stem 28 is made from PTFE, the PTFE layer of the composite filter cloth is usually not removed and the flange and cloth in this instance are joined by bonding the two parts together with a layer of FEP or PFA hot melted or fuse-bonded by heat and pressure between them.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

We claim:

1. A filter cloth assembly for use on a center-feed filter plate of a filter press comprising a first and a second section of filter cloth disposed on opposite sides of said plate, said cloths including concentric holes adapted to align with a corresponding hole in said plate; said first cloth including a tubular stem member having a flanged base, said base being secured to said cloth and extending from said cloth in concentric alignment with said hole in said cloth and adapted for extending through said hole in said plate and mating with a corresponding member on a second filter cloth disposed on the opposite side of said plate; said second cloth including a flanged coupling member having a flanged base secured to said second cloth in concentric alignment with said hole in said second cloth, the coupling member of said second cloth adapted to fit closely and concentrically over the tubular stem of the first cloth extending from the hole in the plate when the cloths are assembled in place on opposite sides of the filter plate; and means for effecting a non-leaking liquid seal between the stem and the coupling member of said first and second cloths as assembled together on the filter plate.

2. An assembly of claim 1 wherein the filter cloths comprise a layered composite of at least one layer of textile fabric and a membrane layer of porous expanded polytetrafluoroethylene.

3. An assembly of claim 2 wherein the textile fabric layer is polypropylene.

4. An assembly of claim 2 wherein the textile fabric layer is polyester.

5. An assembly of claim 2, wherein the textile fabric layer is polytetrafluoroethylene.

6. An assembly of claim 3 wherein the flanged stem of the first filter cloth comprises molded polypropylene.

7. An assembly of claim 4 wherein the flanged stem of the first filter cloth comprises molded polypropylene.

8. An assembly of claim 5 wherein the flanged stem of the first filter cloth comprises polytetrafluoroethylene.

9. An assembly of claim 3 wherein the flanged coupling member of the second filter cloth comprises silicone rubber.

10. An assembly of claim 4 wherein the flanged coupling member of the second filter cloth comprises silicone rubber.

11. An assembly of claim 3 wherein the flanged coupling member of the second filter cloth comprises a fluoroelastomer.

12. An assembly of claim 4 wherein the flanged coupling member of the second filter cloth comprises a fluoroelastomer.

13. An assembly of claim 5 wherein the flanged coupling member of the second filter cloth comprises a fluoroelastomer.

14. An assembly of claim 1 wherein the means for effecting the non-leaking liquid seal comprises securing a band or strap under effective tension around the coupling member of the second filter cloth.

15. An assembly of claim 14 wherein the band or strap is metal.

16. An assembly of claim 14 wherein the band or strap is plastic.

* * * * *